Feb. 19, 1963     A. E. TURNBULL     3,078,064
SPRING-LOADED STUDS
Filed Feb. 26, 1962
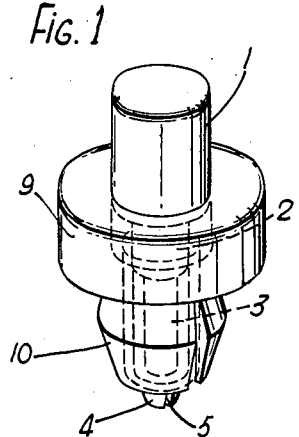
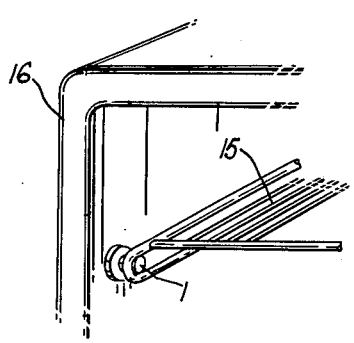
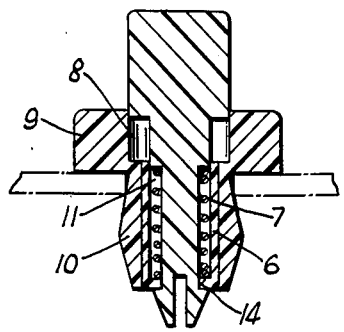
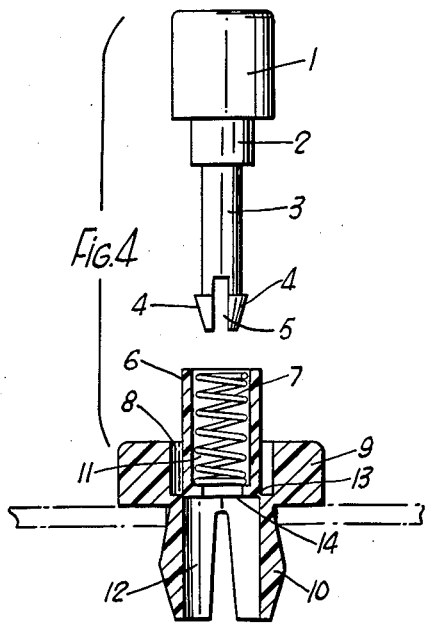
Inventor
ALBERT EDWARD TURNBULL
By Robert W. Beart
Attorney 3,078,064
SPRING-LOADED STUDS
Albert Edward Turnbull, Slough, England, assignor to Illinois Tool Works Inc., Chicago, Ill., a corporation of Delaware
Filed Feb. 26, 1962, Ser. No. 175,776
6 Claims. (Cl. 248—239)

There are various situations in which it is desirable to set a spring-loaded stud in a panel. For example the studs may serve as disengageable supports, as in the walls of a refrigerator cabinet to support removable shelves. As another example a stud may be used as one half of a latch for a door, the stud cooperating with a plate in which is an opening or recess.

The present invention relates to spring-loaded stud assemblies. The essential features of the invention, and various optional features, will be described with reference to the example shown in the accompanying drawings. In these drawings:

FIGURE 1 is a perspective view of the stud assembly;

FIGURE 2 is a perspective view of part of a refrigerator cabinet;

FIGURE 3 is a longitudinal section through the stud assembly; and

FIGURE 4 is an exploded view, partly in section, of the components of the stud assembly before use.

As can be seen from the example, a spring-loaded stud assembly according to the present invention comprises a body having a head 9, an axially split shank 10, and an axial bore 12; a sleeve 6 within the bore which holds the shank in a shape which is wider at a distance from the head than it is close to the head; a stud member which has a stud head 1 and a shank 3, the shank being of sufficient length to pass through the sleeve and having at least one lateral projection 4 which resists complete withdrawal of the stud member from the sleeve 6 but permits limited relative axial movement; and a compression spring 7 confined between shoulders 14, 2 on the sleeve and on the stud member and urging the stud head 1 to project axially from the head 9 of the body.

In use, the body shank 10 is pushed through a hole in a panel which is just large enough to accommodate the part of the shank close to the head 9, and then the sleeve 6 is pushed into the bore 12. This has the effect of holding the shank in a shape which resists withdrawal from the panel. The sleeve is held in its final position by considerable friction between the sleeve and the wall of the bore, the sleeve being a driving fit.

Preferably the body, sleeve, and stud member are each moulded of a resilient plastic, nylon being suitable.

Preferably, as shown, the sleeve 6 is moulded integrally with the body (FIGURE 4), the sleeve being in the position corresponding to the beginning of insertion into the bore of the body, and being joined to the body by a thin annular web 13 which is sheared through when the sleeve is moved into final position (FIGURE 3).

The shank when unstressed may have a tapering bore and parallel exterior, in which case insertion of the sleeve causes the shank to swell. Preferably, however, the bore is cylindrical as shown and the outside of the shank is fattest at its mid length. While being inserted into the panel, the shank yields inwards and then reverts to its initial shape. Then the inserted sleeve locks the shank in this shape.

The shank may be circular in cross section, or square, or of other shapes. It may have a slot on one side of its axis only, or a diametrical slit as shown, dividing it into two fingers, or a greater number of slits.

Preferably the sleeve has a bore considerably larger than the stud shank and has an internal flange 14 at its end remote from the stud head. Then at least part of the spring 7 lies within the sleeve and abuts the internal flange, which serves as one of the shoulders.

Preferably the stud head is a sliding fit in a counterbore 8 in the head of the body, the degree of inward movement of the stud member being limited by engagement of a shoulder at the base of the stud head with a shoulder at the bottom of the counterbore. It is then necessary to insert the sleeve until its outer end is flush with the bottom of the counterbore in the head. Preferably there is a further shoulder 2 on the stud shank to engage the outer end of the spring.

The inner end part of the stud shank may be split diametrically at 5 into two fingers 4, and have an outer surface which includes a shoulder facing towards the stud head and a surface which tapers from the shoulder to the tip of the stud shank. On assembly, the inner end part of the stud shank is pushed through the opening defined by the internal flange in the sleeve, and thereafter (FIGURE 3) the shoulder on the inner end part cooperates with the internal flange 14 on the sleeve to limit outward movement of the stud member.

The head of the stud member may be shaped according to its intended function. For example it may be cylindrical, or it may be hemispherical.

The sleeve may be driven into the bore in the shank by means of a special tool. In that case, the spring and the stud member are inserted subsequently. Alternatively, the stud member itself may be used to drive the sleeve into the bore. In this case, the spring and the stud member may be inserted immediately before the sleeve is driven or may be inserted before the assembly is brought to the panel.

FIGURE 2 shows a stud assembly according to the invention supporting a shelf 15 in a refrigerator cabinet 16. The body is inserted into a hole in the cabinet side wall, and the shank head 1 engages the shelf.

I claim:

1. A spring-loaded stud assembly comprising; a body having a head, an axially split shank, and an axial bore; a sleeve within the bore which holds the shank in a shape which is wider at a distance from the head than it is close to the head; a stud member which has a stud head and a shank, the shank being of sufficient length to pass through the sleeve and having at least one lateral projection which resists complete withdrawal of the stud member from the sleeve but permits limited axial movement; and a compression spring confined between shoulders on the sleeve and on the stud member and urging the stud head to project axially from the head of the body.

2. An assembly according to claim 1 in which the body, sleeve, and stud member are each moulded of a resilient plastic.

3. An assembly according to claim 1 in which the bore in the shank is cylindrical and the outside of the shank is fattest at its mid length.

4. An assembly according to claim 1 in which the sleeve has a bore considerably larger than the stud shank and has an internal flange at its end remote from the stud head, and at least part of the spring lies within the sleeve and abuts the internal flange, which serves as one of the shoulders.

5. An assembly according to claim 1 in which the stud head is a sliding fit in a counterbore in the head of the body, the degree of inward movement of the stud member being limited by engagement of a shoulder at the base of the stud head with a shoulder at the bottom of the counterbore.

6. An assembly according to claim 1, in which the sleeve is moulded integrally with the body, the sleeve being in a position corresponding to the beginning of insertion into the bore of the body, and being joined to the body by a thin annular web which is sheared through when the sleeve is moved into final position.

References Cited in the file of this patent
UNITED STATES PATENTS

| | | |
|---|---|---|
| 2,302,590 | Waite | Nov. 17, 1942 |
| 2,657,892 | Sklenar | Nov. 3, 1953 |